June 14, 1949.  J. H. SCHREIBER  2,473,306
TANDEM SPINDLE LATHE
Filed Jan. 29, 1943  5 Sheets-Sheet 3

INVENTOR:
JOHN H. SCHREIBER,
BY John D. Rippey
HIS ATTORNEY

June 14, 1949.                J. H. SCHREIBER                2,473,306
                            TANDEM SPINDLE LATHE
Filed Jan. 29, 1943                                     5 Sheets-Sheet 4

INVENTOR:
JOHN H. SCHREIBER,
By John D. Rippey
HIS ATTORNEY.

Patented June 14, 1949

2,473,306

UNITED STATES PATENT OFFICE 2,473,306

TANDEM SPINDLE LATHE

John H. Schreiber, St. Louis, Mo.

Application January 29, 1943, Serial No. 473,898

7 Claims. (Cl. 82—2.5)

This invention relates to tandem spindle lathes; and has special reference to a novel type of lathe having two spindles mounted in axially alined tandem relationship for operation in synchronism, and each equipped with a chuck or work holding means whereby a plurality or all of the surfaces of the work pieces may be presented to one or more tools for machining operations.

In the embodiment of the invention chosen for illustration, the machine is capable of producing any work that can be produced on a metal turning lathe of either the engine lathe or turret lathe type. While the machine is shown as manually operated or controlled, I contemplate variation in this particular so as to adapt the machine for use as semi-automatic in operation. The machine is equipped with axially alined or tandem spindles arranged for rotation in the same direction and at the same speed. These spindles are also movable longitudinally relative to each other, thus providing for the transfer of work pieces from one spindle to the other in order to provide a machine that will perform operations upon all surfaces of the work pieces before the work pieces are removed from the machine for further operations, or for any other purpose.

Objects of the invention are to provide a tandem spindle lathe or machine tool of simplified construction and which may be economically manufactured and will render satisfactory service with a minimum of attention; to provide such a lathe or machine that is capable of completely turning any work piece on all of its sides and surfaces before the work piece is removed from the lathe or machine; to provide a lathe or machine that is capable of supporting a work piece on both ends, driving both ends of the work piece to rotate it about its own axis and effect longitudinal movement of the work piece in either direction for the purpose of holding the work piece rigid and moving it relative to the cutting tool or tools to perform turning operations; and to provide a lathe or machine having a spindle rotating about its own axis and which can be moved longitudinally in either direction to move the work piece carried by the spindle relative to the cutting tool or tools, and thereby assuring almost absolute precision in machining the surfaces of cylindrical work pieces.

Other objects of the invention are to provide a lathe or machine tool having a spindle supported for both longitudinal and rotary movements and provided with a chuck for engaging and supporting the work pieces during operation thereon, in combination with mechanisms for imparting said longitudinal and rotary movements to said spindle and for supporting tools for operating upon any exposed surfaces of the work pieces or for performing turning, facing, drilling, boring, reaming, tapping, threading, and other operations, as may be required; to provide mechanism for reciprocating or for moving said spindle alternately in opposite directions as required in the performance of the work of the lathe or machine tool; to provide mechanism for supporting selected tools in selected angular positions for performing their necessary work upon any exposed surfaces of the work pieces irrespective of whether such surfaces be internal or external, and irrespective of whether the tools perform finishing, tapping, threading, or other operations in or on the work pieces; and to provide mechanism under optional control of the user for regulating and governing the action and movements of the spindle and the tools.

Various other objects and advantages of this invention, without specific mention thereof, will be apparent from the following description, reference being made to the annexed drawings, in which—

As shown, the machine includes a hollow cast metallic or welded steel bed the walls 1 of which form a reservoir 2 for a liquid coolant. The walls may be reinforced and strengthened by webs or ribs 3 located at spaced intervals within the reservoir 2 for rigidity. The liquid coolant is supplied to the cutting tools by any known or other appropriate mechanism. The coolant should be supplied to the cutting tools constantly during operation of the lathe or machine, and flows from the top of the bed into a trough 4, and thence through ports 5 into the reservoir 2 for reuse.

Figures 2, 11, 12:
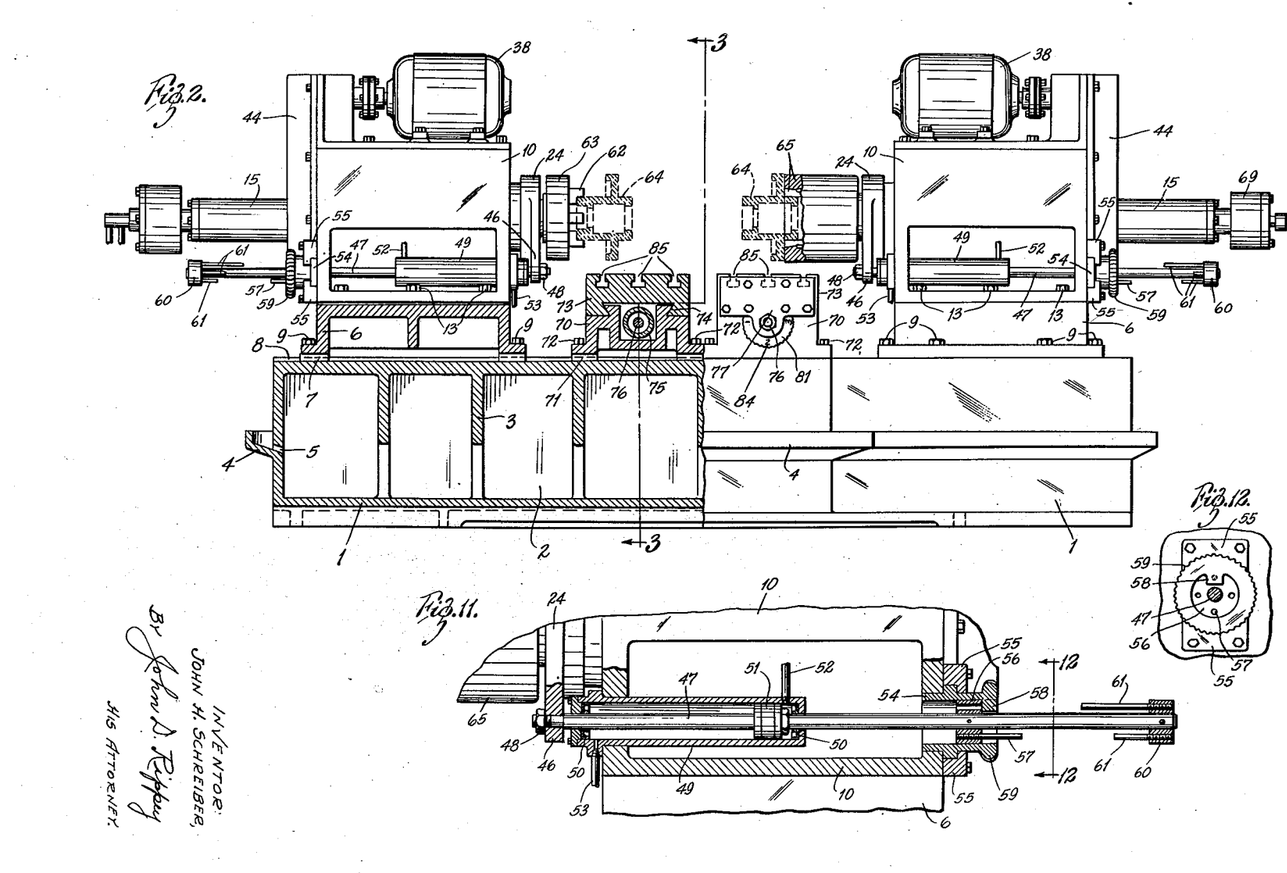
Fig. 2 is a side elevation of the machine with parts shown in section.
Fig. 11 is a sectional view on the line 11—11 of Fig. 5, showing a hydraulic device for imparting reciprocatory movements to the rotary chuck supporting spindle.
Fig. 12 is an enlarged sectional view on the line 12—12 of Fig. 11.

Two duplicate carriages 6 are mounted on the top wall of the bed 1 and are movable to selected positions toward and from each other complementary to the dimensions of the work pieces passing through the machine. These carriages may be guided in their movements by keys 7 engaging in slots 8 (Fig. 2). This interengaging key and slot formation guides the carriages in their movements to different adjusted positions and prevents disalinement or relative lateral displacement. The carriages may be secured rigidly in their different adjusted positions by bolts 9 passing through extended portions of the carriages and engaging the bed on which the carriages are mounted.

Figure 5:
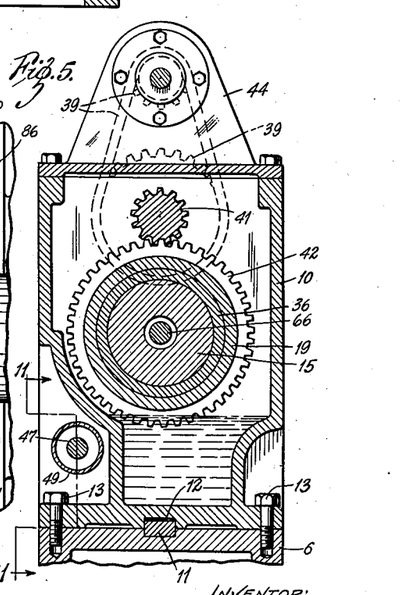
Fig. 5 is a vertical sectional view on the line 5—5 of Fig. 4.

Duplicate spindle housings 10 are mounted on the carriages 6. These spindle housings are guided in movements to adjusted positions on the carriages 6 by keys 11 engaging in grooves 12 (Fig. 5), and are rigidly held in their adjusted positions by fasteners 13. The walls of the spindle housings 10 provide oil receptacles 14 in their lower portions for supplying lubricant to all of the operating mechanism enclosed within the housings.

A hollow spindle 15 of novel form and mode of operation extends horizontally through each housing 10 above the reservoir 14. One end portion of this spindle is journalled for rotation and longitudinal sliding movements in an anti-friction bearing 16 mounted in one end wall of the housing 10. The opposite or inner end of each spindle is journalled for rotation in an anti-friction bearing comprising two spaced portions 17 and 18. The bearing 17—18 is mounted in a spindle bearing support 19. The spindle bearing support 19 constitutes a carriage which is movable longitudinally with the hollow spindle 15 and is mounted in a bushing 20 supported by the opposite end wall of the housing from the bearing 16. The bushing 20 may be split longitudinally as shown at 21 (Fig. 4), and may be moved to and held in proper adjusted position by a ring nut 22. The ring nut 22 is shown mounted on the outer end of the bushing 20, engaging against a shoulder 23 on said bushing, and screwed into a threaded hole in the wall of the housing through which the bushing 20 extends. This provides for moving or forcing the bushing 20 inwardly, as may be required to compensate for wear. The ring nut 22 may be operated in any convenient way, as by a spanner wrench or other appropriate tool.

The bearing 17—18 is held in adjusted positions within the spindle bearing support 19 by a member 24 telescoped on the outer end of the spindle bearing support 19 and secured thereto by detachable fasteners 25. A composite split nut comprising one portion 26 and a second portion attached to said portion 26 is screwed on the hollow spindle 15 between the bearing members 17 and 18. The said sceond portion 27 of the split nut is attached to the portion 26 by detachable fasteners 28. The portion 27 is formed with a slot 29 (Figs. 4 and 6) within the adjacent portions of which an inwardly tapered threaded hole 30 is formed. A tapered plug 31 is screwed into the tapered threaded hole 30. In its inward position (Figs. 4 and 6), the threaded plug 31 functions to spread and hold the portion 27 of the split nut clamped between and against the spaced bearing members 17 and 18. The split nut is thereby locked in position and prevented from becoming displaced upon the hollow spindle 15.

The spindle bearing support 19 is formed with a hole 32 outwardly beyond the bushing 20. The outer portion of the hole 32 may be threaded. From the preceding description, it is plain that the hollow spindle 15 and the nut 26—27 thereon may be rotated within and relative to the spindle bearing support 19. Such rotation of the spindle 15 carries the plug 31 to a position in which said plug is in axial alinement with the hole 32. When the plug 31 is in axial alinement with the hole 32, a socket wrench or tool may be extended through said hole 32 and engaged in a socket 33 in the outer end of the plug 31, and operated to screw the plug 31 outwardly. Such outward movement of the plug 31 may be sufficient to extend the wall of the socket 33 into the inner portion of the hole 32, and thus interlock the nut 26—27 and the spindle bearing support 19. When the nut 26—27 and the spindle bearing support 19 are interlocked as described, the spindle 15 may be rotated while the nut 26—27 is held from rotation, thereby adjusting the nut on and along the spindle. After proper adjustment of the nut on and along the spindle has been effected, the plug 31 may be screwed inwardly to a position in which the wall of the socket 33 is disengaged from the hole 32, thereby locking the nut 26—27 upon the spindle 15, as before described, and leaving the spindle and nut free to rotate within and relative to the spindle bearing support 19.

A plug 34 is provided for the hole 32. The plug 34 cannot be screwed into its proper location in the hole 22 until and unless the plug 31 is inwardly beyond and wholly out of engagement with the wall of the spindle bearing support 19. Thus, the plug 34 functions as a closure for the hole 32 and also as a gage or device for determining that the plug 31 is located in its proper adjusted position in which it cannot engage or contact with the spindle bearing support 19. The plug 34 is formed with a socket 35 in its outer end for engagement and operation by a socket wrench or other tool.

The inner wall of the opening at the inner end of the spindle bearing support 19 is flaring and encloses and engages a complementarily tapered bushing or sleeve 36 secured to the hollow spindle 15 by detachable fasteners 37. In this assembly, the tapered bushings 20 and 36 are retained in cooperative relation while the nut 26—27 holds the spindle bearing support 19 in its proper position upon and relative to the bushing 36. These devices may be modified in various particulars without departure from the principle of the invention.

A motor 38 may be provided for rotating each hollow spindle 15. As shown, the motor 38 is mounted on the spindle housing 10 for driving sprocket or other gearing 39 operatively connected with a shaft 40 rotatively supported in the spindle housing 10. The shaft 40 is journalled for rotation about an axis parallel with the axis of the hollow spindle 15. The ratio of the elements comprising the gearing 39 may be varied as desired by removing different elements of gearing and substituting other elements of different sizes in order to drive the hollow spindle 15 at any desired speed of rotation. The shaft 40 supports an elongated gear 41 and is engaged by a gear 42 detachably secured to the hollow spindle 15 by removable fasteners 43. Thus, each spindle 15 will be rotated when the complementary motor 38 is in operation. The gear 42 is freely movable longitudinally with the hollow spindle 15 when said spindle is moved longitudinally, and remains in constant engagement with the gear 41 during all of such movements and in all of the adjusted positions of said spindle. The spindle 15 may be moved longitudinally while in rotation, and it is unnecessary to stop the motor and thereby stop rotation of the hollow spindle to effect such longitudinal movement of the spindle. The lower portion of the gear 42 extends into the oil contained in the reservoir 14, and thereby supplies oil to the gear 41 and other operating parts within the spindle housing 10. A removable cover plate 44 may be provided for enclosing the gearing 39 and for returning the oil to the receptacle 14 through a port 45. That is, most of the oil received by gravity within the cover plate 44 will return to the receptacle 14 through the port 45.

As already stated, the hollow spindle 15 may be simultaneously rotated and moved longitudinally or axially. The two hollow spindles 15 may be simultaneously rotated at the same speed and moved longitudinally or axially toward or from each other as desired; or said spindles may be simultaneously rotated at the same speed and one of said spindles moved longitudinally or axially toward or from the other, irrespective of whether said other spindle 15 is so moved and irrespective of the direction of longitudinal or axial movement of said other spindle 15.

For imparting such longitudinal or axial movements to the spindle 15 regardless of whether said spindle is being rotated or not, the member 24 associated with each spindle has an extension 46 that is releasably secured to the inner end of a piston rod 47 by a detachable fastener 48 (Figs. 2 and 11). The piston rod 47 extends for longitudinal sliding movements through the end walls of a cylinder 49 rigidly mounted in the lower portion of the spindle housing 10. The cylinder 49 is provided with seals 50 through which the piston rod 47 extends and which permit reciprocation of said piston rod and prevent leakage of the impelling fluid or liquid. A piston 51 within the cylinder 49 is attached to the piston rod 47 and is fitted with any usual or preferred piston rings or packing for restricting or preventing passage of the impelling fluid or liquid from one end to the other end of the piston and between the piston and the wall of the cylinder 49. A tube 52 opens into one end of the cylinder 49 beyond the position to which the piston 51 can move. The tube 52 constitutes a passage for conducting the impelling fluid or liquid under pressure into the cylinder 49 to drive the piston 51 inwardly and toward the inner end of said cylinder, thereby moving the hollow spindle 15 longitudinally or axially in an inward direction, and also constitutes a passage to permit outflow of the fluid or liquid from the cylinder during movement of the piston 51 in an outward direction. A similar tube 53 opens into the opposite end portion of the cylinder 49 to admit an impelling fluid or liquid into said cylinder or to permit outflow and withdrawal of said impelling fluid or liquid from said cylinder. That is, when impelling fluid or liquid is admitted into the cylinder 49 under pressure through the tube 52, fluid or liquid at the opposite end of the piston 51 passes or is withdrawn from the cylinder through the tube 53, and vice versa.

The impelling fluid or liquid may be supplied from any source and controlled by any suitable pump mechanism, or by coordinated pump mechanisms, to force said fluid or liquid through the tube 52 at one end of the piston 51 while permitting withdrawal of said fluid or liquid through the tube 53 at the opposite end of said piston, and vice versa.

Thus, the piston device 51—47 may be moved longitudinally either in an inward or an outward direction to move the hollow spindle 15 longitudinally or axially in an inward direction or in an outward direction either during rotation of said spindle 15 or while said spindle remains unrotated.

The piston rod 47 extends coaxially through a sleeve 54 detachably supported by the spindle housing 10. The sleeve 54 is supported on the housing 10 by removable and replaceable holders 55 preventing longitudinal displacement of the sleeve 54 and leaving said sleeve free for forcible turning to different adjusted positions about its axis. The sleeve 54 is frictionally held by the holders 55 to prevent accidental displacement while leaving said sleeve 54 free for forcible turning about its axis to any selected adjustment. A collar 56 is attached to the piston rod 47 for longitudinal movements with said piston rod. The piston rod 47 and collar 56 cannot be turned relatively.

A number of outwardly extended abutments 57 of different selected lengths are detachably secured to the collar 56. The open outer end of the sleeve 54 is formed with an integral stop 58. The sleeve 54 may be turned to different adjusted positions about its axis to locate the stop 58 in line with any selected abutment 57, leaving the remaining abutments 57 disalined from said stop 58. When the piston rod 47 is moved outwardly, the abutment 57 with which the stop 58 is alined impinges against said stop and thereby stops and prevents further outward movement of the piston rod 47 and of the hollow spindle 15 controlled thereby. In this way, the extent of outward movement of the hollow spindle 15 may be regulated as desired. A hand wheel or handle 59 is attached to the outer end of the sleeve 54 to provide a manually engageable device for turning said sleeve to its selected adjusted positions for this purpose.

A collar 60 is attached to the outer end of the piston rod 47 and supports a number of removable, replaceable and interchangeable abutments 61 complementary to the abutments 57. These abutments 61 function to engage the stop 58 on the sleeve 54 to stop and regulate extent of inward movement of the piston rod 47 and thereby stop and regulate extent of inward movement of the hollow spindle 15. Thus, a number of selected abutments 57 and a number of complementary abutments 61 of varying lengths may be selectively used to vary extent of inward and outward longitudinal movement of the hollow spindle 15 either while said spindle is rotating or remains unrotated. The present invention is adapted for automatic regulation and control to move either or both of the hollow spindles axially or longitudinally, intermittently and automatically, or for manual regulation of such operations at the option of the user. That is, the present invention may be used in either instance.

In order to support the work pieces for the first or initial operations, one of the hollow spindles 15 may be equipped with a chuck 62 of any suitable form or construction. For this purpose, a chuck known as a jaw chuck is suggested. The jaws 62 of the chuck may be cooperatively related to a base 63 in order to clamp upon and release the work piece 64. Such movements of the jaws 62 of the chuck may be effected by any known or appropriate mechanism. For present purposes, it is sufficient to state that the work piece 64 may be engaged with and rigidly held by the jaws 62 during both longitudinal and rotary movements of the spindle 15 which supports the chuck.

After one side of the work piece 64 has been finshed by the tools provided for that purpose, the jaws 62 release the work piece 64 after the work piece has been engaged and rigidly held by a chuck mounted on the opposite axially alined hollow spindle 15. The second chuck which takes the work piece from the first chuck may be of any type or construction adapted for such operation. An appropriate type of such chuck is shown in Fig. 4, although it will be understood that the present invention is not restricted to the use of this specific type of chuck.

Figures 4, 6, 7, 8:
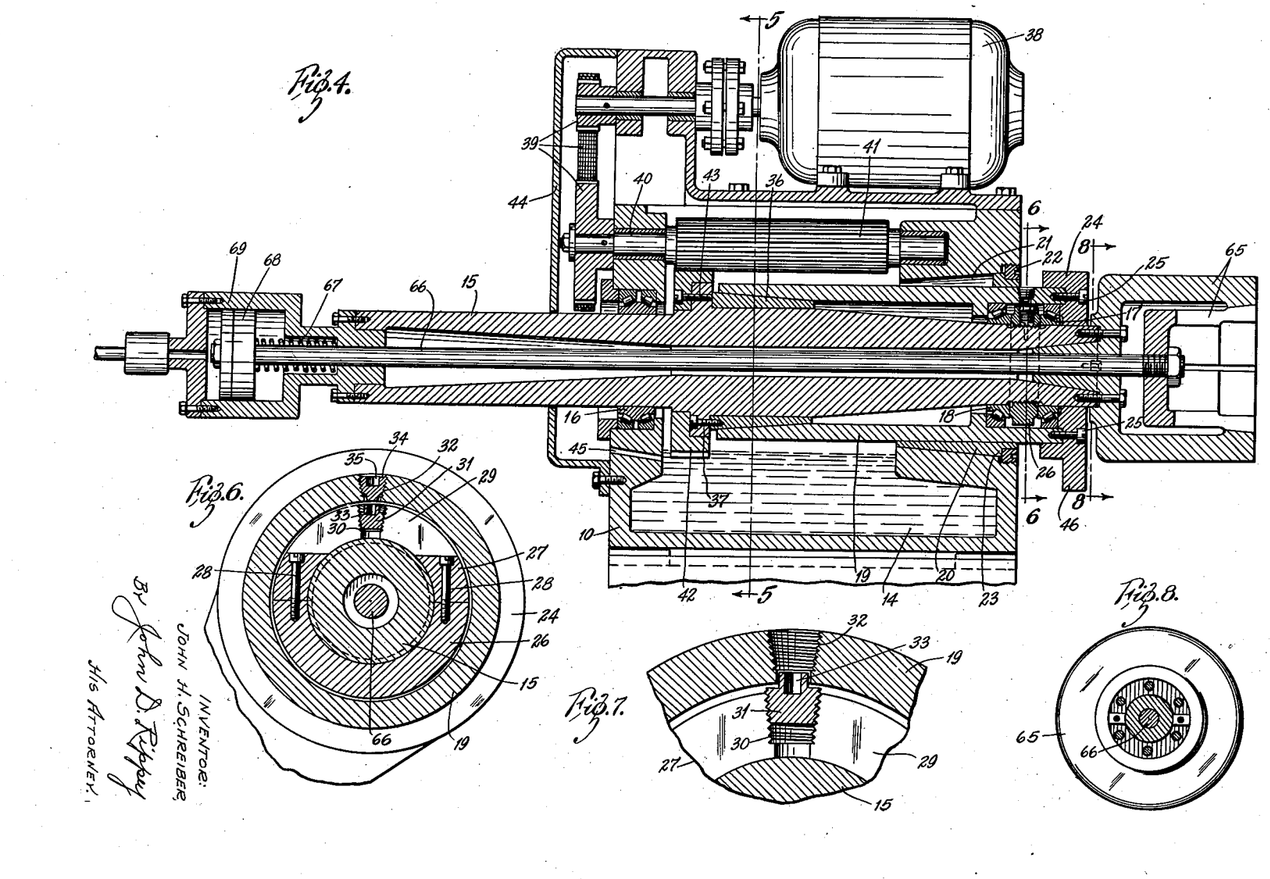
Fig. 4 is a vertical sectional view on the line 4—4 of Fig. 1.
Fig. 6 is a sectional view on the line 6—6 of Fig. 4.
Fig. 7 is an enlargement of a portion of the device shown in Fig. 6 showing the spreading plug in a different position and interlocked with the sliding bearing support in which the spindle is mounted.
Fig. 8 is a detail sectional view on the line 8—8 of Fig. 4.

As shown in Fig. 4, the chuck 65 is of the collet or draw-in type, and includes a rod 66 extending axially through the hollow spindle 15 for relative longitudinal movements. The rod 66 may be actuated outwardly by a spring 67 in a direction to cause the chuck to engage and rigidly hold the work piece 64 before said work is released from the first chuck 62. As shown, a piston 68 is attached to the rod 66 and operates within a cylinder 69. Fluid or liquid under pressure may be admitted into the cylinder 69 at the opposite side of the piston 68 from the spring 67 in order to move the piston inwardly in opposition to the spring 67 to a position in which the work piece 64 may be engaged by the second chuck before the work piece is released by the first chuck. After the work piece has been rigidly engaged by the chuck 65, said work piece is released from the first chuck 62 and is thereafter rigidly supported by the second chuck without possibility of displacement during the final operation of the tools on the work piece. After the work piece has been finished, fluid or liquid is admitted under pressure into the cylinder 69 to operate the movable element of the chuck 65 and thereby release and permit removal of the work piece. Thus, movement of the piston 68 by the spring and by the fluid or liquid under pressure is intermittent or alternative, and such movements may be controlled automatically or otherwise as desired.

The machine may also be operated with a work piece supported by both chucks simultaneously That is, a work piece may be mounted with one end in the first chuck 62 and with the opposite partially finished end in the second chuck 65. While the work piece is mounted in both chucks, both hollow spindles 15 may be rotated at the same speed to cause the tools to operate on and finish all exposed or outside surfaces of the work piece. This may be done by causing the tools to work upon the exposed surfaces of the work piece analogous to the manner in which the tools operate upon the exposed surfaces of a work piece that is supported first in one chuck and then in the other. When a work piece is supported by both chucks at the same time, the hollow spindles 15 not only rotate at the same speed, but move longitudinally in the same directions and in accompaniment with each other until after the work piece has been finished. After the work piece has been finished, at least one of the chucks is moved away from the other in order to permit removal of the work piece from both chucks and from the machine.

Carriage saddles 70 are adjustable along and on the bed 1 and may be held from lateral displacement by keys 71 engaged in the slots 8. These interengaging key and slot devices guide the saddles 70 in their movements to different adjusted positions and prevent relative disalinement and lateral displacement. The saddles may be secured rigidly in their different adjusted positions by bolts 72 passing through extended portions of the saddles and engaging in the bed 1 on which they are mounted.

Figure 3:
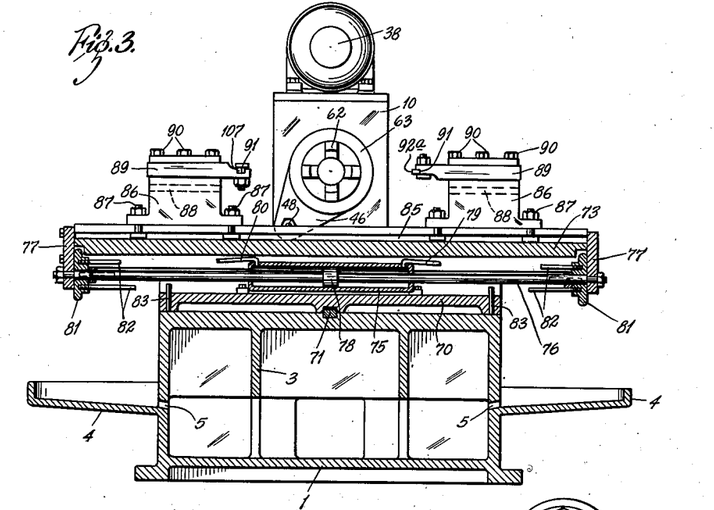
Fig. 3 is a vertical sectional view approximately on the line 3—3 of Fig. 2.

A slide 73 is mounted for sliding movements on each saddle 70 transversely of the plane of the axis of the two spindles 15 and below the chucks supported at the inner ends of said spindles. The slides 73 have interengaging sliding connection 74 with the respective saddles 70. The connection 74 permits free sliding movements of the slide 73 in a straight line normal to the plane of the axis of the spindles 15, but positively prevents movement or displacement of the slides in any other direction. A cylinder 75 is rigidly attached to each saddle 70 (Fig. 3). A piston rod 76 extends axially through the cylinder 75 and has its ends rigidly attached to the slide 73 by fasteners 77. A piston 78 is attached to the rod 76 within the cylinder 75. Tubes 79 and 80 open into opposite ends of the cylinder 75 at opposite sides of the piston 78. Impelling fluids or liquids may be admitted into the cylinder 75 under pressure through the tube 79 to move the piston 78 and thereby the slide 73 in one direction while fluid or liquid at the opposite end of the piston 78 passes or is withdrawn from the cylinder through the tube 80, and vice versa.

The slides 73 at all times cover, and prevent metal shavings dropping from any work pieces 64 and other foreign materials from lodging on the carriage saddle 70. The said slides constitute means for holding selected tools in different adjusted positions and also for preventing shavings from the work pieces 64 and other foreign materials from lodging on said carriage saddles 70. They contribute very substantially to the accuracy and precision of machining the work pieces that are formed or processed by the machine. Because of the fact that the slides 73 positively prevent said shavings and other foreign materials from lodging on the saddles 70, the contacting portions of said saddles 70 and the slides 73 are not worn, deformed nor displaced thereby. As a consequence, the slides 73 which carry the tools 92, 93, etc. always operate said tools in the same respective planes, with the result that the machining operations of said tools on the work pieces 64, and said work pieces when completed, are invariably accurate and precise.

A rotary support 81, which also functions as a handle, is mounted on each end of the rod 76 adjacent to the respective ends of the slide 73 and beyond the ends of the saddle 70. A number of inwardly extended abutments 82 of different selected lengths are detachably secured to each support or handle 81. These abutments extend inwardly parallel with the axis of the rod 76. A stop 83 is attached to the saddle 70 in position to be engaged by any selected abutment 82 in lateral alinement therewith. That is, any abutment 82 whose axis is alined with the adjacent stop 83 will engage said stop during lateral movement of the slide 73 by the piston 78 as described, and will thereby limit and stop further lateral movement of the slide 73 in the direction in which it had been moving, but will not prevent or interfere with movement of said slide by the piston 78 in the opposite direction. The abutments 82 may be complements of each other, or may be characterized by any desired relationship to regulate and control extent of lateral movement of the slide 73 as desired, and as may be required for the specific type of work being performed on the machine. The outer surfaces of the supports or handles 81 may be provided with legible gages 84 having definite relationship to the abutments 82 to guide the operator of the machine in making needed adjustments of the abutments 82 for the type of work being performed. These abutments 82 may be removably secured to the supporting handles 81 so that they may be detached, interchanged or substituted as desired.

The slide 73 is provided with a plurality of slots 85 extending longitudinally of said slide, which is transversely of the machine and of the plane of the axis of the hollow spindles 15. These slots 85 are parallel with each other and may be of inverted T-formation (Fig. 2), or of other preferred shape. One or more tool supports 86 is rigidly attached to each slide 73 by releasable fasteners 87 engaging in the slots 85 and rigidly securing the supports 86 to said slides for movement thereby during lateral reciprocating movements of the slides by the pistons 78, as described. Because of the fact that the fasteners 87 can be loosened and tightened at will, it is possible to secure the supports 86 to the slides 73 in any desired positions. This construction permits a plurality of tool supports to be mounted on each slide 73 in different positions as needed to support tools of different types and for different purposes for operating on different surfaces of a work piece 64. For instance, tool holders may be secured in different positions on each slide 73 for finishing end surfaces, outer peripheral surfaces, inner peripheral surfaces, or other exposed surfaces on a piece of work, or even for performing tapping and other operations.

Figures 1, 1B:
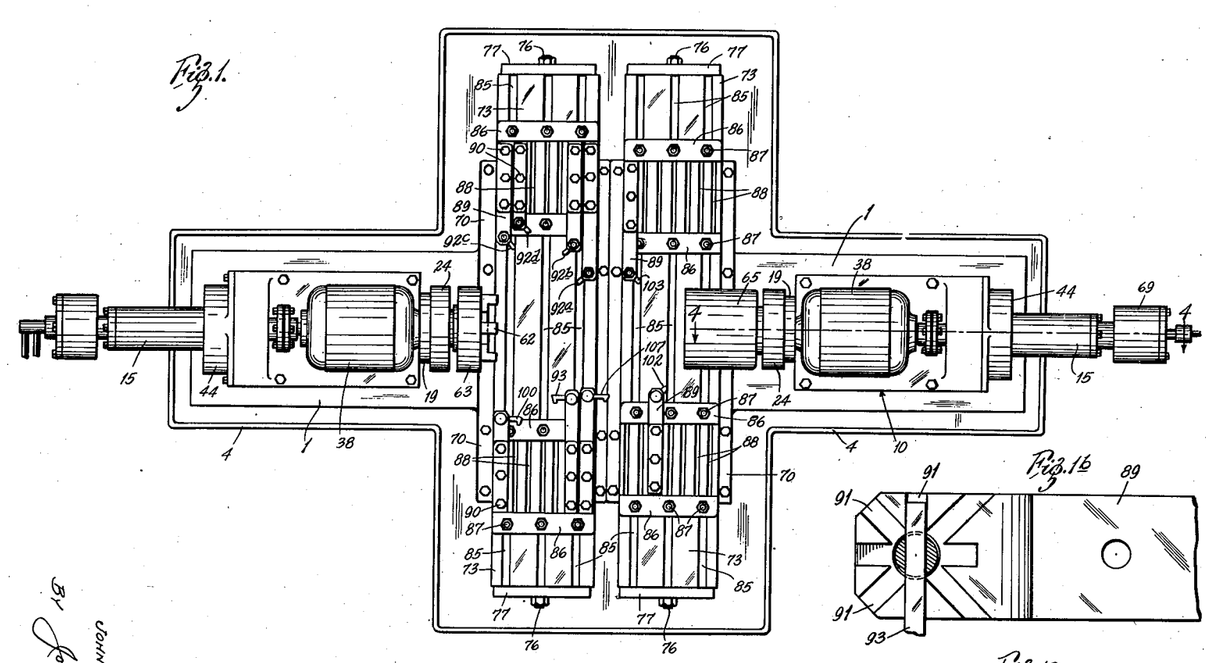
Fig. 1 is a plan view of a tandem spindle lathe or machine constructed and operated within the principles of the present invention.
Fig. 1b is a sectional view of the clamping bolt on the line 1b—1b of Fig. 1a, showing the grooves or slots in the tool holder disposed at various angles for receiving and holding tools extended at different angles from the tool holder.
Figure 1A:
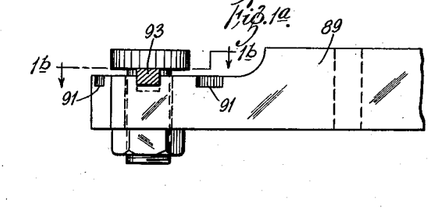
Fig. 1a is an enlarged sectional side elevation of a reversible and interchangeable tool holder included in the invention.

Each support 86 is formed with a number of slots 88 parallel with the slots 85. Tool holders 89 may be secured to the respective supports 86 by releasable fasteners 90 engaging said tool holders and also engaging in the slots 88. For this purpose the slots 88 may be of inverted T-form like the slots 85, so that the fasteners 90 may clampingly engage the tool holders 89 and the walls of the slots 88. This permits removal, replacement, interchange or adjustment of any tool holders regardless of the others, so that one or more tool holders may remain rigidly attached to the support while any one or more of the remaining tool holders may be removed, interchanged or adjusted. The tool holders 89 are preferably duplicates so that they may be used interchangeably, and are provided with formations 91 permitting different types of tools, such as those shown at 92 and 93, to be attached thereto in different angular positions in order to operate upon different exposed surfaces of the work piece. Thus, tools such as indicated by 92 may be attached to selected holders 89 to work upon outer peripheral or flat surfaces of the work piece, while other tools, such as those indicated by 93, may be provided to work upon inner peripheral surfaces of the work piece, and other tools for tapping the work piece or performing other operations thereon also may be used optionally. To permit these various angular adjustments of the tools on the tool holders, the grooves 91 may be formed in the work holders in directions to receive and hold the tools in the angular positions desired (Fig. 1a). The tool holders 89 are interchangeable. They may be detached from one support 86 and attached to another that is mounted on the same slide 73, or may be attached to a holder 86 on the other slide 73. The tool holders may also be inverted in order to support the tools properly for operation upon the work, it being understood that the work is rotated by the spindles 15 constantly in the same direction, irrespective of whether the work is supported by one spindle or by the other, or is supported by both spindles at the same time.

Figure 9:
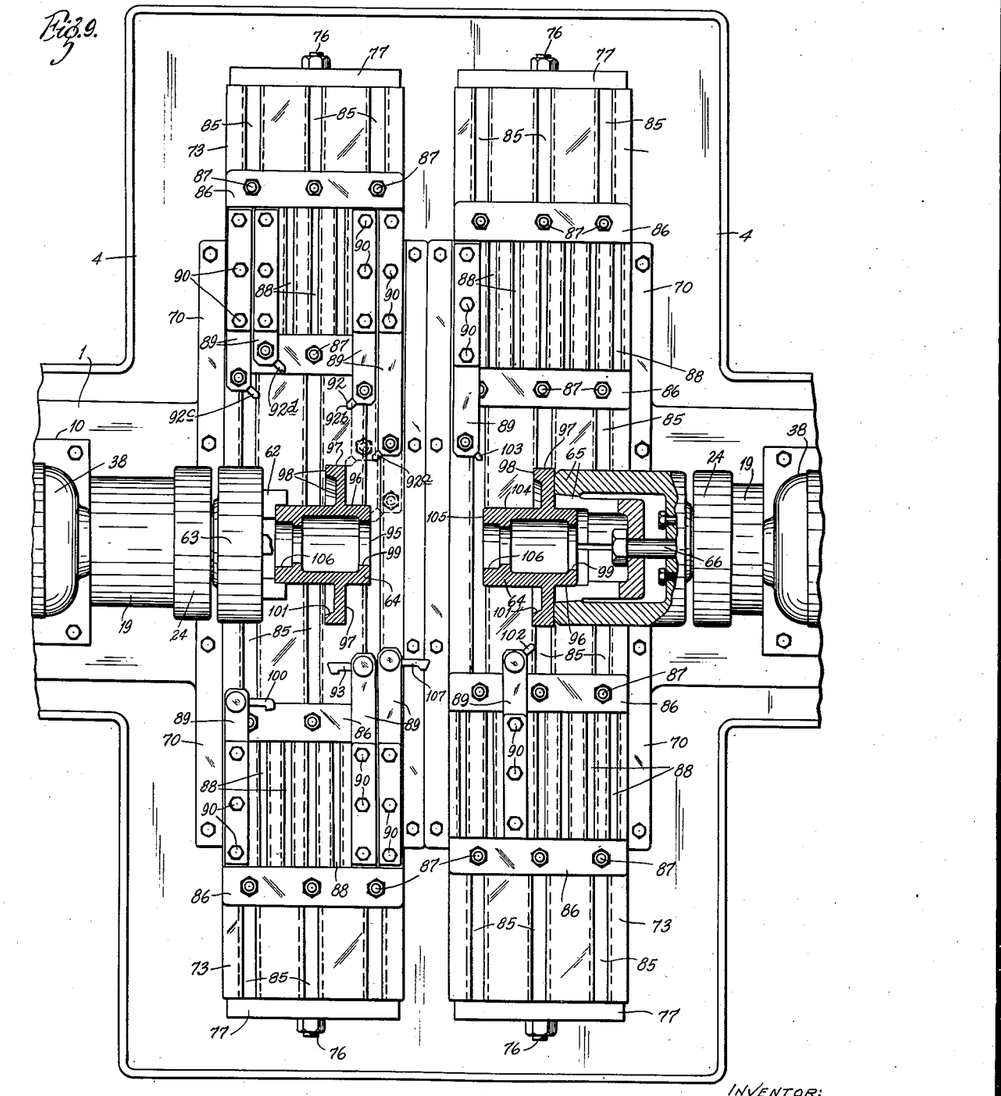
Fig. 9 is an enlarged plan view of the tool supporting slides, and showing in section two pieces of work on the supporting and operating chucks for said work pieces during operation of the tools on opposite surfaces of said work pieces.
Figure 10:
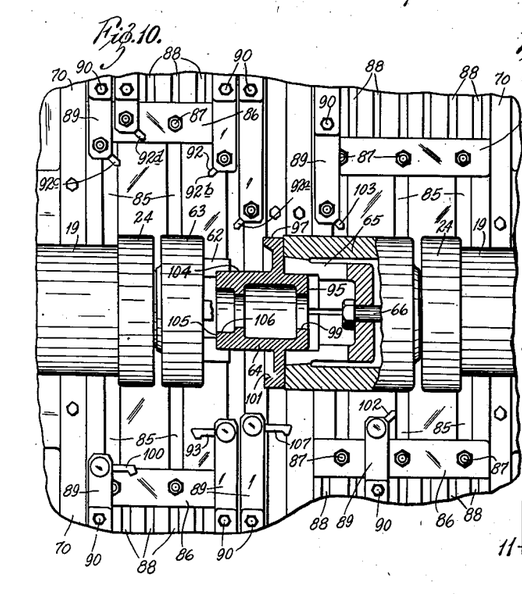
Fig. 10 is a plan view with parts in section showing the chucks in the positions they occupy during the time that a work piece is being transferred from one chuck to the other.

Typical operations of the machine may be understood by reference to Fig. 9 of the drawings. As there shown, the tool 92a, which constitutes one of the several tools 92, can be caused to work upon the end wall 95 of the work piece 64, and also upon the outer peripheral surface 96 of said work piece. The tool 92b, which is also included in the series of tools 92 may work upon the flat surface 97 of the work piece 64 while the tool 92a is working upon the flat surface 95 of the work piece. The tool 92a can also be caused to work upon the outer peripheral surface 97 of the work piece, whereas the tool 92c, included in the series of tools 92, can be caused to work upon the surfaces 98 of the work piece. The tool 92d, also included in the series of tools 92, is an auxiliary tool and may be used for any desired purpose, as for operating upon the outer peripheral surface 97 instead of the tool 92a.

The tool 93 is an example of a tool for working on the inner peripheral surface 99 of the work piece while the work piece is held by the chuck 62; and the tool 100 is a tool that can be used to work upon the inner peripheral surface 101 of the work piece while the work piece is held by the chuck 62.

After the work piece 64 has been rigidly engaged by the chuck 65, a tool 102 may operate further upon the surface or surfaces 98, or may perform all of the operations on said surfaces instead of using the tool 92a for that purpose; and the tool 103 may be caused to finish the outer peripheral surface 104 of the work piece from the surface 98 to the end, and may also be caused to provide a finished surface 105 on the end of the work piece and which was covered and concealed while the work piece was mounted in the chuck 62. The inner peripheral surface 106 which was covered and concealed by the chuck 62 during the time that the work piece was mounted in said chuck is exposed when the work piece is mounted in the chuck 65, and may be operated upon and finished by a tool 107 in the opposite tool holder 86. That is, the inner peripheral surface 106 may be operated upon and finished by a tool 107 mounted on the same support on which the tool 93 is mounted. Thus, the inner peripheral surface 99 may be finished by a tool 93 at the same time that a surface 106 is being finished by a tool 107. As shown, the inner peripheral surfaces 99 and 106 are of slightly different diameters, and the tools 93 and 107 are located on the same tool holder to provide these finished inner peripheral surfaces of different diameters at the same time. Because of the fact that the slides 73 may be operated independently and relatively, the tool holders mounted on said slides and operated thereby may be moved to cause the various tools on the different tool holders to operate on the pieces of work at the same or at different times, as desired. Moreover, the tools 93 and 107 may be replaced by tapping tools for performing tapping operations in either or both ends of the work piece, wherever such tapping operations are desired. Also, tools for performing other operations, such as drilling, reaming, and threading, can readily be performed by this machine simply by locating appropriate tools for that purpose in the place of any of the tools shown and described for illustrative purposes only. Or, tools for these operations may be added in any of the unoccupied slots 98 to supplement the tools which are shown for illustration. Or, as before mentioned, one or more additional tool holders 86 may be added or substituted for the specific holders 86 shown, so as to adapt the machine for the type of work to be performed.

Work upon exterior cylindrical surfaces, such as 96, 97 and 104, may be performed even during the time that the work pieces are being transferred from the first chuck 62 to the second chuck 65. This is because at least some of said exterior peripheral surfaces are constantly exposed, and because the work piece is always in rigid connection with one or both chucks, and is never released by the first chuck until after it has been rigidly engaged by the second.

It is evident that this machine satisfactorily attains all of its intended objects and purposes. In one phase, the machine is complete with a single rotary and longitudinally movable spindle 15, the mechanism for operating said spindle under control of the operator, and the devices for supporting and controlling one or more tools for operating upon or processing the pieces of work supported by the chuck mounted on the spindle 15. That is, such a machine without the associated axially alined spindle 15 and its cooperating mechanisms is within the scope of the invention. For many types of work pieces, the invention comprises a machine having the two axially alined or tandem spindles 15 supported for simultaneous rotation and axial movements in longitudinal directions, irrespective of whether said spindles are moved axially in longitudinal directions while said spindles are rotating or not. When the two rotary and longitudinally movable spindles are used in the same machine, work pieces may be rigidly held by the chucks on both spindles at the same time, or work pieces may be first processed while supported wholly by one spindle, then processed while engaged by both spindles preparatory for transfer from one spindle to the other, and then processed while wholly supported by the spindle to which the work pieces are transferred. The tool supports may be moved relative to the chucks and the work pieces thereon during rotation of the work pieces by the spindles 15; or, in certain types of work, the tools may be operatively moved during both longitudinal and rotary movements of the work pieces. As disclosed, the invention is not restricted to the performance of any specific type of work, but is adapted for the performance of various types of work. All variations of the specific form and arrangement of the invention designed to adapt it for its intended uses and within the scope of equivalent limits are contemplated. I do not restrict myself unessentially in any respects, but what I claim and desire to secure by Letters Patent is:

1. In a tandem spindle lathe, two spindles supported in axially alined tandem relationship for respective or synchronous rotation and longitudinal axial movements, mechanisms for synchronously or respectively rotating and moving said spindles in longitudinal axial directions, chucks mounted on said respective spindles for cooperatively supporting pieces of work during processing thereof or for separately supporting pieces of work as desired, and laterally adjustable tool supports for supporting tools to operate upon the work supported by said chucks as aforesaid.

2. In a tandem spindle lathe, two spindles supported in axially alined tandem relationship for rotation and for longitudinal axial movements, mechanisms for rotating said spindles in synchronism or respectively as desired, a chuck mounted on each spindle for jointly or respectively supporting the work during processing thereof, mechanisms for moving said spindles longitudinally in synchronism or respectively toward and from each other while said spindles are rotating or not as desired to transfer the work from one chuck to the other and to support the work in different positions for processing, a support for tools to operate upon the work supported by said chucks, and mechanism for moving said support as required for operation of the tools thereon upon the work during rotation of the spindle supporting the work, and while said spindle is moving longitudinally or not as desired.

3. In a tandem spindle lathe, two spindles supported in axially alined tandem relationship for rotation and for longitudinal axial movements, a chuck mounted on each spindle for supporting the work pieces at successive stages of processing of said work pieces, mechanisms for rotating said spindles and said chucks in synchronism and at the same speed or respectively as desired, and hydraulic mechanisms for moving said spindles axially simultaneously or respectively toward each other to positions for transfer of the work pieces from one of said chucks to the other, whereby the same or different tools may work upon different exposed surfaces of said work pieces while said work pieces are supported by said respective chucks and during the time that the work pieces are being transferred from one chuck to the other.

4. In a tandem spindle lathe, two spindles mounted in axially alined tandem relationship for rotation and for relative longitudinal axial movements, mechanism for rotating each of said spindles independently of the other, mechanism for moving each of said spindles longitudinally independently of the other, chucks mounted on said spindles respectively for jointly or respectively supporting and rotating the work pieces during machining operations on said work pieces, slides supported for movement in planes transversely of the axis of work pieces supported by said chucks, and means for securing and holding tools on said slides for machining the work pieces supported by said chucks.

5. In a dual working head spindle lathe, two chucks supported in axial aligned tandem relationship for rotation and for longitudinal axial movement, mechanisms for rotating said chucks in synchronism or individually, mechanism for moving said chucks longitudinally in synchronism or individually toward and from each other while said chucks are rotating or stationary to transfer the work from one chuck to the other and to support the work in different positions, a support for tools to operate upon the work supported by said chucks, a mechanism for moving said support as required for operation of the tools thereon upon the work during rotation of the chucks supporting the work and while said chucks are moving longitudinally or not, as desired.

6. In a machine tool of the class described, the combination with spaced working heads, a rotatable and axially movable spindle for supporting work in each head, a series of tools carried by tool supports between the heads longitudinally spaced and adapted to bring selected tools into operative position within the path of the work when said work is moved longitudinally between said heads, and stop devices for gauging and limiting the movement of the spindles to selectively position the work in its longitudinal path for selected machining operations by selected tools.

7. In a tandem spindle lathe, two spindles supported in axially aligned relationship for rotation and for longitudinal axial movement, means for effecting selectively simultaneous longitudinal movements and separately timed longitudinal movements of said spindles, means for selectively rotating said spindles in synchronism and for separately rotating said spindles, a chuck secured to each spindle and longitudinally movable and rotatable therewith and adapted for selectively jointly or individually supporting a work piece during processing thereof, whereby a work piece may be selectively transferred from one chuck to the other chuck or supported for tool actions jointly or individually by the chucks in different processing positions.

JOHN H. SCHREIBER.

REFERENCES CITED

The following references are of record in the file of this patent:

UNITED STATES PATENTS

| Number | Name | Date |
| --- | --- | --- |
| 330,600 | Marsh | Nov. 17, 1885 |
| 1,050,828 | Hendrickson | Jan. 21, 1913 |
| 1,115,972 | Potter | Nov. 3, 1914 |
| 1,217,895 | Ambarn | Mar. 6, 1917 |
| 1,231,946 | Schellenbach | July 3, 1917 |
| 1,244,664 | Warren | Oct. 30, 1917 |
| 1,299,883 | Warren | Apr. 8, 1919 |
| 1,334,335 | Warren | Mar. 23, 1920 |
| 1,815,012 | Schellenbach | July 14, 1931 |
| 1,873,157 | Shippy | Aug. 23, 1932 |
| 1,912,515 | Davenport | June 6, 1933 |
| 1,914,984 | Smith | June 20, 1933 |
| 1,947,829 | Cole | Feb. 20, 1934 |
| 1,950,039 | Smith | Mar. 6, 1934 |
| 2,012,066 | Haas | Aug. 20, 1935 |
| 2,048,107 | Collins | July 21, 1936 |
| 2,093,257 | Godfriaux | Sept. 21, 1937 |
| 2,182,939 | Brinkman | Dec. 12, 1939 |
| 2,263,404 | Armitage | Nov. 18, 1941 |